3,115,578
THERMOLUMINESCENT RADIATION DOSIMETER
James H. Schulman, 337 Onondaga Drive,
Forest Heights, Md.
Filed June 22, 1960, Ser. No. 38,082
14 Claims. (Cl. 250—71)
(Granted under Title 35, U.S. Code (1952), sec. 266)

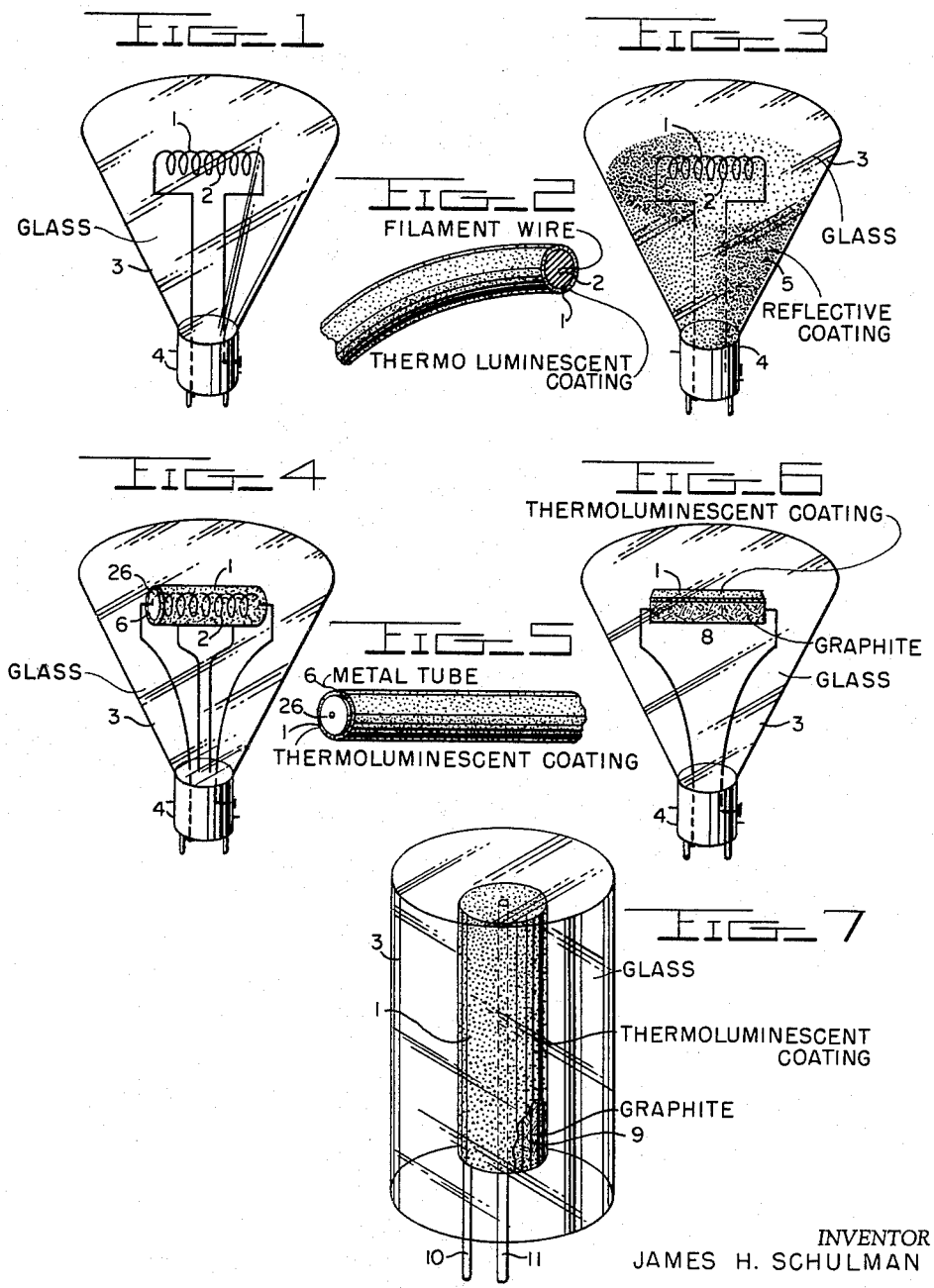

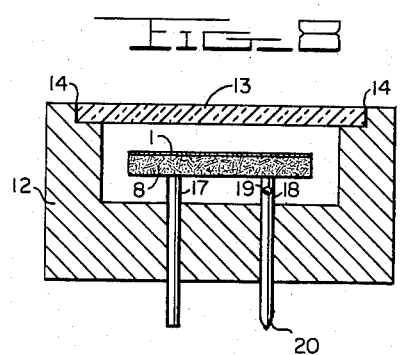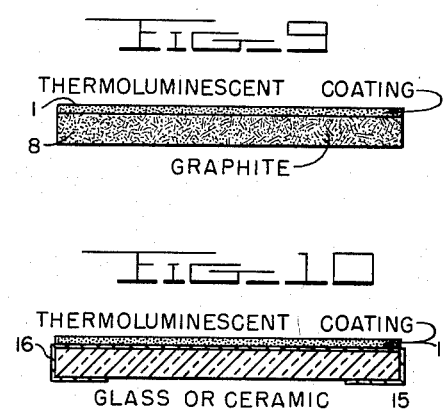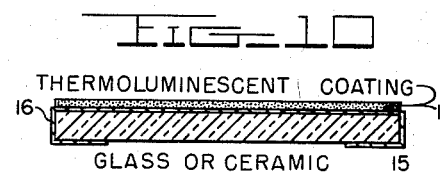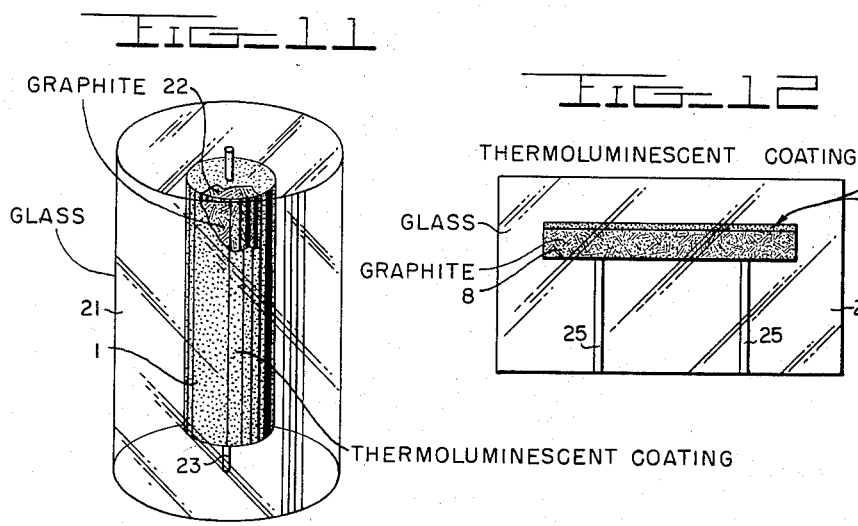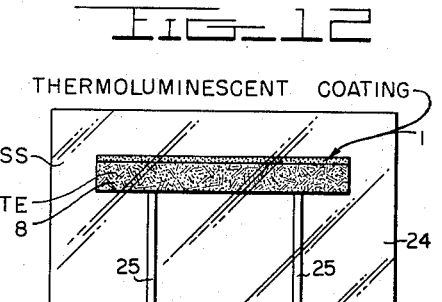

The invention described herein may be manufactured and used by or for the Government of the United States of America for governmental purposes without the payment of any royalties thereon or therefor.

The invention relates to a device for measuring the dosage of ionizing radiation, such as gamma ray and X-rays, through the use of thermoluminescent materials or phosphors.

A thermoluminescent material or phosphor has the properties of taking up and storing energy in the form of trapped electrons when exposed to ionizing radiation, such as gamma rays, and of subsequently releasing these electrons from their traps by heating of the material, with the production of a luminescent glow. The number of electrons trapped in the material is proportional to the intensity of the ionizing radiation and hence the light emitted during the subsequent heating step can be used as measure of the radiation dose.

It has been heretofore proposed to use thermoluminescence in dosimetry for the monitoring of personnel working in areas of gamma radiation, but to the present it has not been widely employed due to disadvantages of a practical nature. In some previous designs consisting of a wafer of thermoluminescent material on a support plate, the radiation-exposed dosimeter is heated to develop the luminescent glow by dropping it into a hot oven maintained above the glow-peak temperature of the thermoluminescent material. In alternate designs in which the dosimeter is formed b yrubbing powdered thermoluminescent material into the interstices of a fine wire gauze, the gauze has been electrically heated after radiation exposure to produce the luminescent glow. In a further design the thermoluminescent material has been adhered to a small metal backing plate by means of a binder and the exposed assembly glowed out by heating electrically using the metal plate as the electrical resistance element.

A disadvantage of glowing out the exposed dosimeter by dropping it in an oven is the necessity of having to maintain the oven continuously at a quite high temperature. A further disadvantage of this type of operation is the comparatively low rate at which heating of the dosimeter to the glow temperature is attained. A fast heating rate is desirable in order to obtain a high brightness of glow and to expedite the dose reading operation. The heating rate can be increased, of course, by maintaining the oven at a much higher temperature than actually needed, but such a measure will aggravate the first-mentioned disadvantage. Another disadvantage of oven heating of the dosimeter is the necessity of providing means in the oven structure for collecting and viewing of the developed luminescence. The dosimeter design in which loose thermoluminescent powder is mounted in the interstices of metal gauze has the obvious disadvantages of difficulty in reproducibility in level of loading of the powder and of poor stability of the assembly to mechanical shock, vibration and handling. The design of dosimeter in which the radiation sensitive material is applied to a metal plate has the disadvantage, like the metal gauze type design, of having no convenient package for handling, of being open to the air and subject to contamination from handling, and to mechanical disturbance in the wearing or reading of it.

It is an object of the present invention to provide a dosimeter of the thermoluminescence type for detecting and measuring dose of ionizing radiation, such as gamma rays and X-rays, which can be easily worn as a personnel dosimeter, the thermoluminescent material quickly heated to glow temperature without the use of oven heating, which is protected against the atmosphere and against adverse effects due to handling or wearing and to mechanical shock and vibration.

It is also an object to provide a dosimeter of the above kind which is low in cost and can be manufactured in mass production employing techniques and machinery presently used in the electric lamp and radio tube industry.

The above and other objects of the invention can be accomplished in the radiation dosimeter of my invention which comprises, broadly stated, a thermoluminescent material mounted in an inert environment in an hermetically sealed envelope and arranged to be quickly heated therein by electrical means, the envelope being at least in part transparent for transmission of light therethrough from the thermoluminescent material. The inert environment can be provided by evacuating the envelope or by filling it with a gas of low thermal conductivity which does not emit light on being heated in contact with the envelope and the materials within the envelope, including the thermoluminescent material. A gas of this kind is argon.

For a more complete understanding of the invention, reference is had to the following description taken in conjunction with the accompanying drawings in which is shown, by way of illustration, several forms of the radiation dosimeter of my invention.

In the drawings like numerals indicate like parts and

FIG. 1 is a showing of one form of the dosimeter in accordance with the invention wherein the thermoluminescent material is coated on an electrical heating filament within the envelope, FIG. 2 is an enlarged detail view in section of the coated filament of FIG. 1, FIG. 3 is a showing of the dosimeter of FIG. 1 provided with a light reflective coating on the envelope, FIG. 4 is a showing of a modified form of dosimeter in accordance with the invention wherein the thermoluminescent material is applied to a tubular sleeve designed to be heated electrically by means of a filament within the tube, FIG. 5 is an enlarged detail view in section of the coated tube of FIG. 4, FIG. 6 is a showing of a further modified form of the dosimeter of the invention in which the thermoluminescent material is applied to a plate which serves as the resistance element for the electrical heating, FIG. 7 is a showing of a dosimeter of the invention in which the thermoluminescent material is applied to a cylindrical body of electrical resistance material which is adapted to be connected to a suitable current source for heating.

FIG. 8 is a showing of a dosimeter of the invention in which the envelope is made of metal and provided with a transparent window and the thermoluminescent material is applied to a plate type base which is designed to be heated electrically.

FIG. 9 is an enlarged detail view in section of the radiation-sensitive element and plate type base of FIG. 8 in which the base is formed of electrical resistance material and the thermoluminescent material is applied thereto.

FIG. 10 is a like view in which the plate type base is of ceramic material and coated with an electrically conductive layer over which is applied a layer of thermoluminescent material.

FIG. 11 is a showing of a dosimeter of the invention which is designed to be heated inductively, and FIG. 12 is a showing in cross-section of another form of dosimeter of the invention designed to be heated inductively in which the envelope is cylindrical in shape.

Referring to FIGS. 1 to 3, the dosimeter there shown is of conventional incandescent electric light bulb construction with the exception of the thermoluminescent coating on the wire of the coiled heating filament 2. The envelope or bulb 3 of transparent glass in sealed evacuated condition is fixed in the metal shell of the base 4 which is provided with electrical contacts, which may be metal pins as shown, for connection with a suitable current source which may be of low voltage, e.g., 6 volts.

A light reflective coating may be provided on the interior or exterior of the glass envelope 3 as is done in the electric lamp industry. FIG. 3 shows a conventional aluminum reflective coating at 5 on the exterior surface of the glass.

The dosimeter shown in FIGS. 4 to 5 is the same in construction as that of FIG. 1 with the exception of the construction and arrangement of the support and heating means for the thermoluminescent layer. As shown, the thermoluminescent layer 1 is coated on a metal tube 6, which may be of any metal or material of good heat conductivity, for example, copper, nickel, aluminum or ultra-thin glass, through which the coiled heating filament 2 extends in spaced relationship. Light from the heated filament is confined to the tube by means of discs 26 of ceramic, or of other suitable electrical insulating material, which are inserted in the open ends of the tube and perforated for passage of the wire to the filament. The tube 6 is supported by means of a pair of wires 7, affixed thereto, which extends through the glass envelope 3 in gas-tight seal and are embedded in the metal shell of the base 4 by means of a solid resin material which is used in the electric lamp industry to embed the current lead wires from the filament and fix the seal glass envelope in the metal shell of the lamp base.

FIG. 6 shows a dosimeter of the same construction as that of FIG. 1, in which is employed a preferred type of construction and arrangement of the heating element and thermoluminescent coating. As shown, the heating or electrical resistance element is a graphite plate 8 on which is coated a layer of the thermoluminescent material 1. The graphite plate is supported by and electrically connected to the lead wires which are suitably affixed thereto.

In FIG. 7, a dosimeter is shown in which the geometry of the evacuated glass envelope is cylindrical. The heating element 9 is a rod of graphite over which is coated the thermoluminescent material 1. The graphite rod has electrodes 10 and 11 embedded therein, the electrode 11 being coaxial in the graphite rod. The graphite rod may be hollow and in such case the electrodes are embedded only in the end walls of the graphite rod. The electrodes extend through the graphite rod and are bonded to the glass envelope in vacuum seal and serve as the support for the graphite rod.

In FIGS. 8 to 10, the dosimeter has a composite envelope in the form of a metal portion 12, which may be aluminum, and a transparent glass window 13 seated at 14 in the metal portion in gas-tight relationship. Sealing of the glass window in the metal portion of the envelope can be accomplished by bonding the glass to the metal with a resin type adhesive. The heating means is of the plate type in which the thermoluminescent coating 1 is carried by a graphite plate 8 or by a ceramic or vitreous ceramic plate, such as the glass plate 15, as shown in detail in FIGS. 9 and 10, respectively. In the case of the graphite plate, the coating 1 is applied directly thereto. In the case of the ceramic plate, an electrical conducting film or layer 16, for example, of silver, platinum, or tin oxide, is applied to a face of the ceramic or glass plate and the thermoluminescent layer applied directly thereover. The conducting film is continued down over the ends of the ceramic or glass plate and on to the under surface thereof for a distance sufficient to make electrical contact with the electrodes 17 and 18. The conducting layer may be arranged on opposite faces of the ceramic or glass plate 15, if desired, but in such case the transfer of heat to the thermoluminescent layer will be delayed. The electrodes 17 and 18 are attached to the plate 15 in such manner as to also serve as a support for the plate in the envelope and are extended through the metal envelope in vacuum seal and insulated condition. One of the electrodes is hollow, as shown at 18, and provided with an orifice 19 communicating with the interior of the envelope for the purpose of pumping down the envelope to the vacuum. The electrode 18 is pinched together at the lower end and tipped with solder to form a seal 20 to hold the vacuum.

Whereas the dosimeters as described above are all provided with means for making direct contact between the electrical resistance element and the source of current, the dosimeters of the invention can be so designed as to be heated by induction currents.

FIG. 11 shows a dosimeter which is designed to be heated inductively as by passing through an energized high frequency heating coil. The cylindrical shaped transparent glass envelope 21 is evacuated and contains a cylindrical heating element which, as shown, is a rod of graphite 22 on which is coated the thermoluminescent layer 1. The graphite rod is supported in the envelope by means of a metal pin 23 which is fixed to the rod and passes axially through it to be anchored in the opposite ends of the cylindrical envelope in vacuum seal. The cylindrical heating element 22 may also be a thin metal cylinder, similarly, or otherwise suitably supported in the glass envelope.

In FIG. 12, the dosimeter is also designed to be heated inductively. The evacuated transparent glass envelope 24 of cylindrical shape contains a plate-type resistance element 8 and a coating of thermoluminescent material 1 thereon which is the same as or similar to that shown in FIGS. 6, 8 and 9. The plate 8, which as shown is of graphite, but which may also be of a metal such as copper or nickel, is supported in the envelope by means of metal pins 25, 25 attached thereto and anchored in the glass of the bottom wall of the envelope in vacuum seal. The envelope 24 can be formed by fusing glass discs as end walls to a length of glass tubing with prior mounting of the plate 8 on one of the glass discs by means of the pins 25, 25. By the insertion of a small tubulation through the wall of the envelope (not shown), the envelope can be pumped down to the vacuum or filled with the inert gas, in accordance with known technique.

The thickness of the thermoluminescent coating or layer in the construction of the dosimeters of the invention may be that generally used for phosphor layers in cathode ray or television tubes, for example, about 2 to 100 mgs. of the phosphor/cm.$^2$. The coating can be applied to the surface of the wire, graphite, glass or ceramic by employing known techniques for the coating of phosphors on substrates in which the thermoluminescent material as a powder is mixed with a binder to form a fluid paste which is coated on the substrate and the coating baked, for example, at about 200° C., to harden it and adhere the thermoluminescent material to the surface of the substrate. A binder of general use for the coating is an aqueous solution of potassium silicate. A silicone cement such as that sold commercially under the tradename DC805 (Dow-Corning Co.) may also be used for the coating.

Thermoluminescent materials which may be used as the radiation sensitive element or layer 1 in the dosimeters of the invention are those which have energy storage persistence at normal temperatures, i.e., at temperatures in the range of from about 20 to 100° C. Such materials will also have energy storage persistence at lower temperatures due to the favorable effect of the absence of heat on this property. A practical range of energy storage persistence for the materials is from about one-half hour to 30 days and longer. Materials of a low order of storage persistence in the aforesaid range but which have a high order of luminescence brightness may be useful in special applications. A preferred material for the radiation sensitive element is the phosphor, manganese-activated calcium fluoride, $CaF_2:Mn$, developed by Ginther and Kirk, NRL Progress Report, September, 1956; J. Electrochem. Soc. 104, 365 (1957). This phosphor is characterized by having a dominant glow peak at about 250° C., which singular property is believed to be due to the presence of a small amount of oxide-oxygen in the crystal lattice of the calcium fluoride. It has sufficient sensitivity for low dose applications and has deep stable electron traps. However, it has been hindered in its use in thermoluminescent dosimetry by a spurious luminescence and because of this, reliable detection of ionizing radiation doses in the milliroentgen range was not feasible. Another, but less preferred phosphor for the radiation sensitive element in the dosimeters is calcium sulfate containing a small amount of manganese as luminescence activator, $CaSO_4:Mn$.

I have found that when the dosimeter material is housed in a sealed enclosure and the environment in the enclosure is inert, i.e., completely or almost completely free from gases which emit light on being heated in contact with the envelope or materials within the envelope and which is chemically inactive with respect to the envelope and the materials therein, spurious luminescence can be completely suppressed to reach a threshold of practical detection of radiation dose of an order heretofore not attainable with the use of thermoluminescence materials as the radiation sensitive element. An environment effective for completely suppressing the spurious luminescence is a high vacuum, $10^{-3}$ to $10^{-5}$ mm. Hg or better, for which the envelope is evacuated as has been described above. Argon gas is also an inert environment in the sealed envelope of the dosimeter for this purpose. The environment in the sealed envelope of the dosimeter should also be one of low thermal conductivity so as to obtain a rapid heating of the thermoluminescent material with use of low ampere inputs. An environment which is a high vacuum or argon gas meets this condition also. Gases which, on the other hand, will give rise to spurious luminescence in the dosimeters are, for example, oxygen, nitrogen and carbon dioxide, which are constituents in air and to which thermoluminescent dosimeters have been exposed in prior art efforts.

Dosimeters can be made in accordance with the invention which are sufficiently sensitive to encompass the health physics range which reaches from an order of milliroentgens of the radiation up to large doses which are of the order of 100's and 1000's of roentgens. With the use of the manganese-activated calcium fluoride phosphor of Ginther and Kirk, above, dosimeters of the invention can be constructed which have a linear response from a few milliroentgens to at least $10^5$ roentgens of cobalt 60 gamma radiation and independent of the dose rate over the range of 10 mr./min. to 7000 r./min., at least.

The energy dependence of the dosimeters can be minimized or compensated for by the use of external shielding about the dosimeter, for which there is suitably used a perforated shield of the type designed by Klick and described in U.S. Patent 2,752,505, but made of tin instead of lead. In this way, the dosimeter can be made essentially independent of energy between about 40 kev. and 1.2 mev.

The operation of the dosimeter of the invention depends upon the fact that a thermoluminescent material will store energy in the form of trapped electrons when exposed to ionizing radiation, such as gamma and X-rays. By heating the irradiated thermoluminescent material, the stored electrons are released from their traps to give a luminescent glow. Since the number of electrons trapped is proportional to the intensity of the ionizing radiation, the intensity of the luminescent glow can be employed for determination of the radiation dose. The luminescent glow is observed with a photosensitive device such as a photomultiplier tube and the glow peak noted. Either the height of the glow peak or the area under the glow peak can be used as the measure of the radiation dose.

In application of the dosimeters they are first conditioned by heating the thermoluminescent material to a point well beyond its glow peak to expel any trapped electrons from their traps. This is done by either connecting the dosimeter to a suitable current source in the case of the dosimeters of the type shown in FIGS. 1 to 10 or by inserting into the field of high frequency induction coil in the case of the conductively heated type dosimeters shown in FIGS. 11 and 12. The dosimeter is then ready to be carried by personnel in areas of radiation hazard. To read the dose which has been accumulated in the thermoluminescent material, the dosimeter is again heated electrically and the luminescent glow observed as set out above. After this heating and reading, the dosimeter is again in a discharged state and ready for reuse. Heating may take place in a matter of 15 to 30 seconds or less by controlling the voltage or power applied to the electrical heating means in the envelope.

It is apparent from the foregoing description that the invention may be variously embodied without departing from the spirit or scope thereof, and, accordingly, it is not intended that the invention be limited to the specific embodiments appearing herein above except as is defined in the appended claims.

What is claimed is:

1. A radiation dosimeter comprising an hermetically sealed envelope enclosing an environment which is inert and of low thermal conductivity and in which is mounted a thermoluminescent material having energy storage persistence at normal temperatures and an electrical heating means adapted and arranged to quickly heat said thermoluminescent material to above the glow temperature thereof, said envelope having at least a portion thereof transparent and arranged to transmit light emitted by said thermoluminescent material.

2. A radiation dosimeter as defined in claim 1, wherein the thermoluminescent material is manganese-activated calcium fluoride containing a small amount of oxide-oxygen in the crystal lattice and having a dominant glow peak at about 250° C.

3. A radiation dosimeter comprising an hermetically sealed transparent envelope enclosing an environment which is inert and of low thermal conductivity and in which is mounted a thermoluminescent material having energy storage persistence at normal temperatures and an electrical heating means adapted and arranged to quickly heat said thermoluminescent material to above the glow temperature thereof.

4. A radiation dosimeter comprising an hermetically sealed transparent glass envelope enclosing an environment which is inert and of low thermal conductivity and in which is mounted a thermoluminescent material having energy storage persistence at normal temperatures and an electrical heating means adapted and arranged to quickly heat said thermoluminescent material to above the glow temperature thereof.

5. A radiation dosimeter comprising an hermetically sealed transparent glass envelope filled with argon gas in which is mounted a thermoluminescent material having energy storage persistence at normal temperatures and an electrical heating means adapted and arranged to quickly heat said thermoluminescent material to above the glow temperature thereof.

6. A radiation dosimeter comprising an evacuated transparent glass envelope in which is mounted a thermoluminescent material having energy storage persistence at normal temperatures and an electrical heating means adapted and arranged to quickly heat said thermoluminescent material to above the glow temperature thereof.

7. A radiation dosimeter as defined in claim 5, wherein the thermoluminescent material is manganese-activated calcium fluoride containing a small amount of oxide-oxygen in the crystal lattice and having a dominant glow peak at about 250° C.

8. A radiation dosimeter comprising an hermetically sealed transparent glass envelope enclosing an environment which is inert and of low thermal conductivity and in which is mounted a thermoluminescent material having energy storage persistence at normal temperatures and an electrical heating means adapted to quickly heat said thermoluminescent material, said thermoluminescent material being directly affixed to the heating element of said electrical heating means.

9. A radiation dosimeter comprising an hermetically sealed envelope filled with argon gas in which is mounted a thermoluminescent material having energy storage persistence at normal temperatures and an electrical heating means adapted to quickly heat said thermoluminescent material to above the glow temperature thereof, said thermoluminescent material being directly affixed to the heating element of said electrical heating means.

10. A radiation dosimeter comprising an evacuated transparent glass envelope in which is mounted a thermoluminescent material having energy storage persistence at normal temperatures and an electrical heating means adapted to quickly heat said thermoluminescent material to above the glow temperature thereof, said thermoluminescent material being directly affixed to the heating element of said electrical heating means.

11. A radiation dosimeter comprising an evacuated transparent glass envelope in which is mounted a thermoluminescent material having energy storage persistence at normal temperatures and an electrical heating means adapted to quickly heat said thermoluminescence material to above the glow temperature thereof and comprising a plate shaped heating element, said thermoluminescent material being directly affixed to said plate-shaped heating element.

12. A radiation dosimeter as defined in claim 11, wherein the thermoluminescent material is manganese-activated calcium fluoride containing a small amount of oxide-oxygen in the crystal lattice and having a dominant glow peak at about 250° C.

13. A radiation dosimeter comprising an evacuated transparent glass envelope in which is mounted a thermoluminescent material having energy storage persistence at normal temperatures and an electrical heating means adapted to quickly heat said thermoluminescent material to above the glow temperature thereof and comprising a cylindrical-shaped heating element, said thermoluminescent material being directly affixed to said cylindrical-shaped heating element.

14. A radiation dosimeter as defined in claim 13, wherein the thermoluminescent material is manganese-activated calcium fluoride containing a small amount of oxide-oxygen in the crystal lattice and having a dominant glow peak at about 250° C.

References Cited in the file of this patent

UNITED STATES PATENTS

| 2,755,400 | Stiles | July 17, 1956 |
| 2,761,070 | Moos et al. | Aug. 28, 1956 |
| 2,775,710 | Ludeman | Dec. 25, 1956 |

OTHER REFERENCES

Solid-State Dosimeters for Radiation Measurement, by J. E. Schulman, from Proc. of the Second United Nations International Conference on The Peaceful Uses of Atomic Energy, United Nations Publications, 1958, vol. 21, pp. 220–225.